United States Patent Office 2,984,015
Patented May 16, 1961

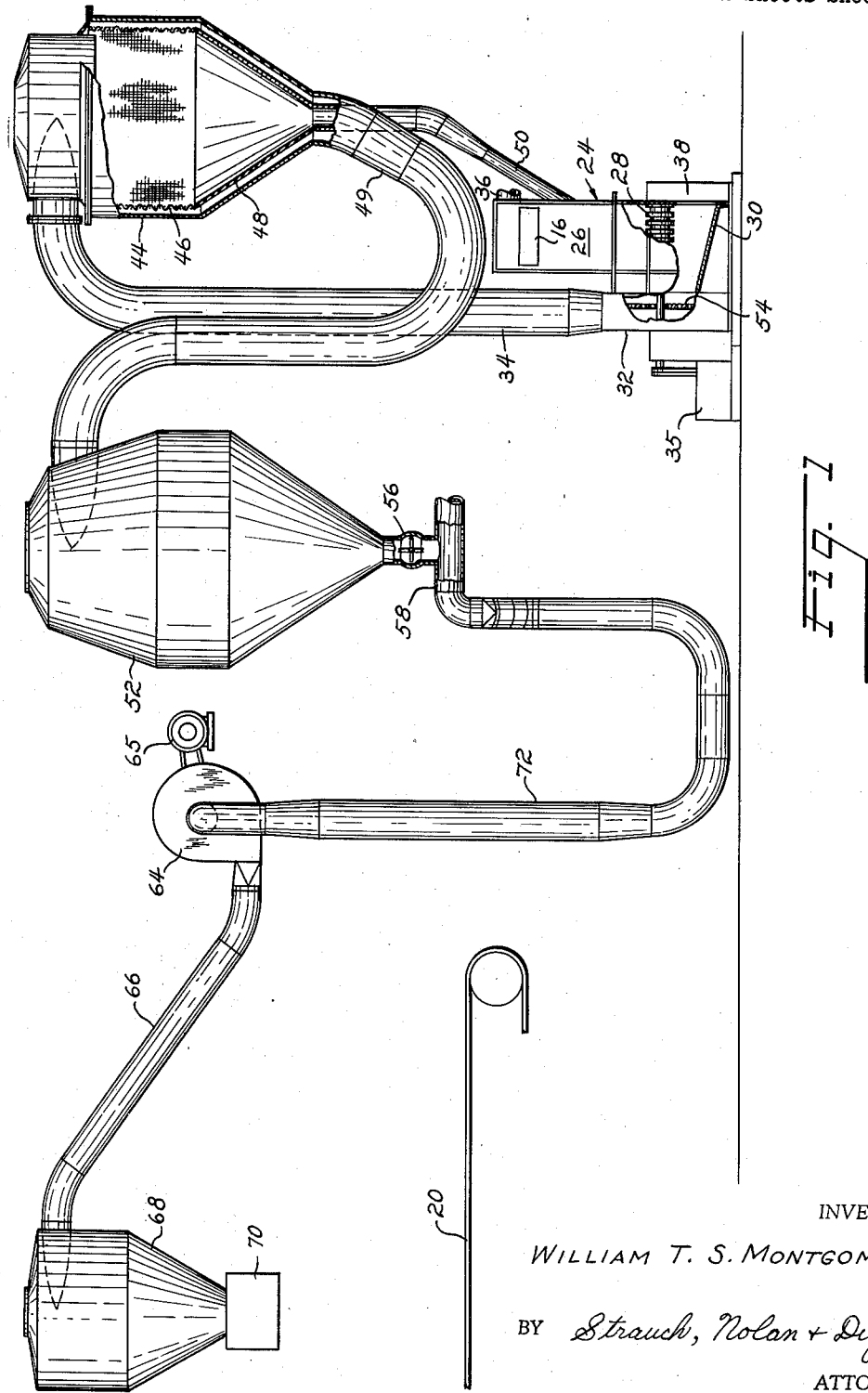

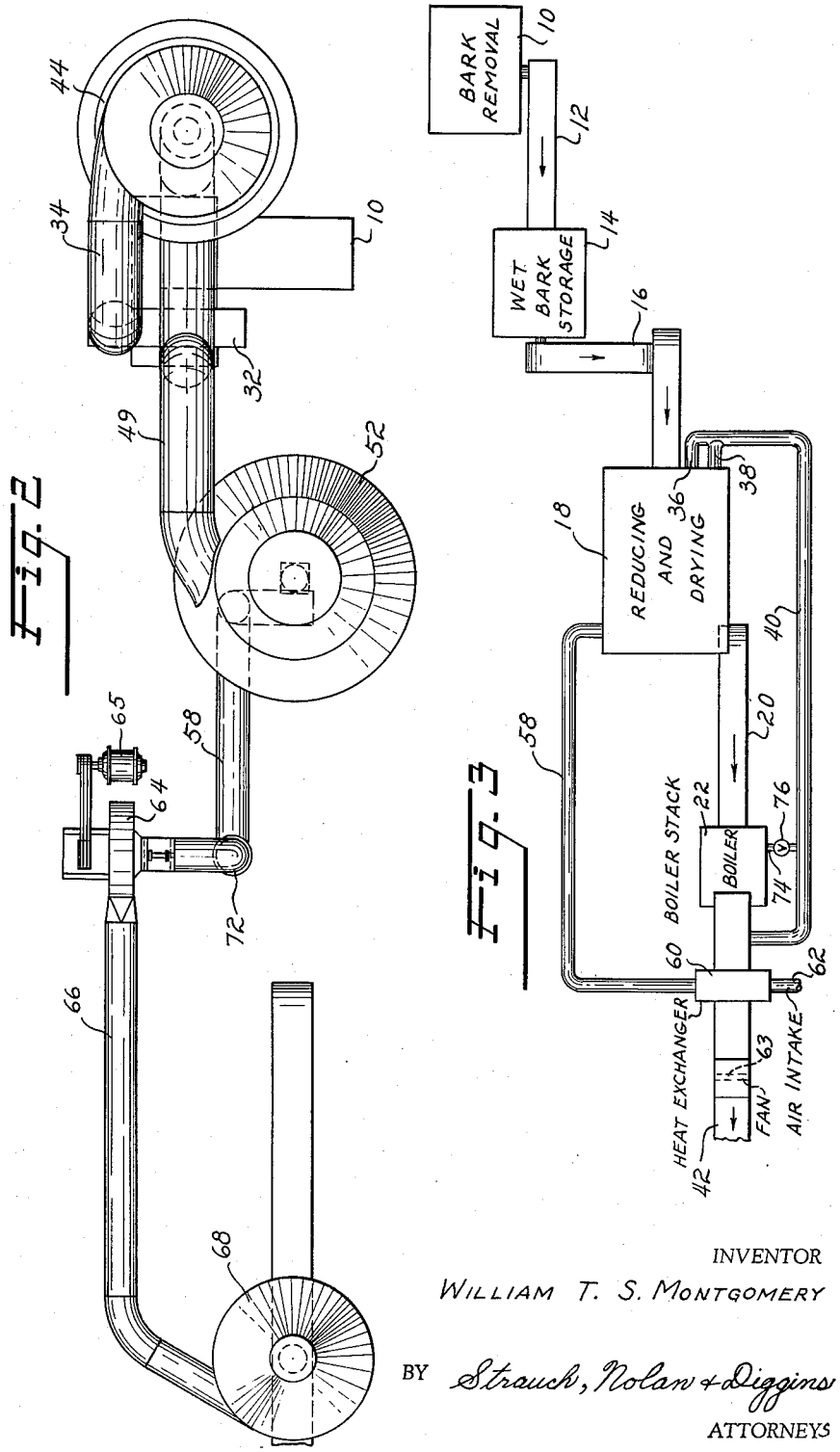

2,984,015
APPARATUS FOR PARTICULATING WOOD FOR FUEL
William T. S. Montgomery, % Jacksonville Blow Pipe Co., P.O. Box 862, Jacksonville, Fla.
Filed Sept. 30, 1954, Ser. No. 459,253
1 Claim. (Cl. 34—60)

The present invention relates to methods and apparatus for drying materials and more particularly to methods and apparatus for converting wet wood or woody material to a dry and usable fuel.

Waste wood and woody materials occur in a variety of forms including bark, bagasse and waste and scrap from veneer, paper and saw mills and frequently this woody waste has a high moisture content. For example, bagasse has a moisture content of 40 to 50% and green bark has about the same. Some processes used for removing bark from logs add moisture to the bark and in the hydraulic bark removal process, the bark frequently contains over 75% moisture. As used in this application, the term "moisture content" means the weight of water divided by the bone-dry weight of wood so that when wood has a 50% moisture content, one-third of the weight is water and two-thirds is wood.

With high moisture contents, the wood or woody material has a very low fuel value and above about 65% moisture content, wood will not support combustion. Because of the low, and in some cases non-existent fuel value, waste wood and woody material has presented a difficult, annoying and expensive disposal problem to such industries as the lumber, paper and sugar industries where the amount of waste is high.

It has long been recognized that the woody waste had a fuel value if the moisture were removed but there has been no completely satisfactory inexpensive way of drying the woody material sufficiently to realize this fuel value. In some instances, wet woody waste has been pressed to extract some of the water so that the waste would support combustion and could be incinerated. Furnaces have been designed to burn wood waste with a high moisture content but the fuel value was extremely low.

I have found that wet bark, wood chips, waste wood and woody material can be quickly, efficiently and economically converted to a useful fuel having a surprisingly high fuel value. Even if it is undesirable or unnecessary to use the dried waste as a fuel, the present invention greatly simplifies disposal by conditioning the waste so that it can be burned.

While the present invention may be applied to wet wood in various forms, for convenience, it will be described in connection with the conversion of wet bark to a useful fuel. In the case of one paper mill using the hydraulic process of bark removal, the waste bark has a moisture content of over 75%, will not support combustion and is disposed of by dumping at a high cost. If the moisture content were reduced to 65% or less the bark could be incinerated with a saving of the dumping cost. In my invention, the moisture content of the bark cannot only be reduced to the point where the bark can be incinerated but can be quickly, conveniently and inexpensively reduced to the point where substantially the entire fuel value (about 9000 B.t.u. per pound) can be utilized as useful fuel.

One of the principal objects of the present invention is therefore to provide a simple and efficient method and apparatus for converting wet wood or wood material into a dry useful fuel.

Another object is to provide a simple and efficient method and apparatus for drying wood particles.

Another object is to provide a method and apparatus for converting wet wood to fuel by reducing the wood to small size and drying it.

Another object is to provide a method and apparatus for reducing wood to particles of substantially uniform size.

Another object is to provide an improved fuel.

These and other objects and advantages reside in certain novel features of construction, arrangement and combination of parts and in steps and processes as will hereinafter be more fully set forth and pointed out in the appended claims.

Figure 1 is a diagrammatic elevation of one form of apparatus carrying out my invention;

Figure 2 is a top plan view of the apparatus shown in Figure 1; and

Figure 3 is a diagrammatic view showing the lay-out of an apparatus of the present invention.

Referring to Figure 3, 10 indicates a bark removal unit which may consist of a hydraulic debarker, tumbling drums with or without water or steam, or any other known debarker. The particular work removal method forms no part of the present invention and any suitable method can be used. The bark is usually transferred by a conveyor 12 to a wet bark storage bin 14 and as needed, may be delivered by conveyors 16 to the reducing and drying apparatus indicated generally at 18 and shown in detail in Figures 1 and 2. The dried bark is then delivered by conveyor 20 to a boiler furnace 22. While I have shown conveyor belts, it is to be understood that screw conveyors or other forms of conveyors can be used equally well.

Referring now to Figures 1 and 2, the wet wood to be converted into fuel is fed by the conveyor 16 to a suitable wood breaker indicated generally at 24. This wood breaker may be of various forms but I prefer to use a mechanism such as that shown in my copending application Serial No. 362,790 filed June 19, 1953, entitled Wood Reduction and Handling, now U.S. Patent 2,869,793. The wood enters a hopper 26, is broken or chopped into small pieces by the rotor 28 and drops into a trough or conduit 30.

The suction side of a suitable fan or blower 32 is connected to the trough or conduit 30 at the bottom of the wood reducing mechanism so that wood chips dropping through the wood breaker are sucked into the fan and blown upward through a conduit 34 by the blower 32. A suitable motor or engine 35 drives both the fan and the breaker.

The hopper 26 is provided with a gas inlet 36 and the trough or conduit 30 opposite the fan 32 is provided with a gas inlet 38 through which hot gases are introduced. While hot gas from any source could be used it is preferable for economic reasons to use hot flue gases. In the embodiment illustrated, a conduit 40 (Figure 3) connects the gas inlets 36 and 38 to the stack 42 of the boiler furnace 22 so that hot flue gases are drawn into the breaker 24 and the wood chips are blown upward by the fan 32 with these hot gases through the conduit 34 to a pneumatic screen cyclone 44. Because of the high moisture content of the wood and the fact that the flue gases are substantially inert, there is little or no danger of fire even though some sparks may be included in the flue gases. The purpose of circulating the wood in the hot flue gases is to heat the wood chips so that a high moisture content in the flue gas is not a disadvantage and may be an advantage to avoid "case hardening" as hereafter described. This is true even if the flue gas becomes cooled below its dew point and actually precipitates moisture into the wood.

The cyclone 44 is closed at the top and is provided with an imperforate cylindrical sleeve 45 whihc extends into a substantially cylindrical interior screen or grid 46 which in turn is spaced from the wall of the cyclone. Below the cylindrical screen or grid 46, the pneumatic screen cyclone has an imperforate conical portion 48 connected to the screen 46 and spaced from and substantially parallel to the conical portion of the cyclone 44. I have found that a space of about 3 inches between the screen 46 and conical portion 48 and the wall of cyclone 44 is sufficient for the purposes of the invention.

The hot gases and wood chips blown upward through the conduit 34 enter the cyclone 44 tangentially and as they pass downward inside the screen 46, chips which are of small enough size, pass through the screen 46 and out through a conduit 49. Chips too large to pass through the screen, drop down through a conduit 50 and are directed back to the wood breaker 12. The large chips are returned to the conduit 34 again and again until they are reduced to a size small enough to pass through the screen or grid 46. The relative sizes of conduits 49 and 50 are so chosen that sufficient gas velocity is maintained in conduit 49 to convey the chips to a second cyclone 52.

One purpose of employing the screen or grid 46 and recirulating oversize chips is to prolong the action of the hot gases and raise the temperature of the chips. For this purpose I may also secure a perforated plate 54 on the rotor of fan or blower 32 so that the chips are not subjected to the impact velocity of the fan blades. Use of the plate 54 also reduces the power required to operate the fan and eliminates the shattering effect of the impact of the fan blades on the chips but it is to be understood that while the perforated plate is often desirable, it is not essential.

The chips small enough to pass through the screen 46 are conveyed through the conduit 49 by the stream of hot gas and enter tangentially at the top of the second cyclone 52. The cyclone 52 is open at the top to permit the escape of the hot gases and is provided at the bottom with a suitable air lock such as the rotary air lock indicated generally at 56. The chips passing through the air lock 56 drop into a conduit 58 which may be connected at one end to a heat exchanger 60 in the stack 42. The heat exchanger 60 has an air intake 62 which is open to atmospheric air. It is to be noted that the conduit 40 for the hot flue gases withdraws the gases between the furnace 22 and the heat exchanger 60 so that the flue gases entering the breaker 24 will be at maximum temperature. If desired, a fan 63 may be placed in the stack to insure proper draft.

The other end of the conduit 58 is connected to the suction side of a fan or blower 64 driven by a suitable motor 65. The blades of the fan or blower 64 may also be provided with a perforated plate similar to plate 54 to reduce power consumption and shattering of the chips.

From the fan or blower 64, the chips pass through a conduit 66 and enter a third cyclone 68. This third cyclone may be provided with a counterbalanced dump valve of known construction. The conveyor 20 receives the chips and conveys them to the furnace or to storage. If desired, a heat exchanger 70 may be provided to preheat chips going to the furnace.

As shown in Figure 1, the conduit 58 has a substantially vertical portion 72 which is larger than the remainder of the conduit 58. This enlarged portion 72 is provided so that the velocity of the air will be reduced to a point such that it is insufficient to raise wood particles having a moisture content in excess of a predetermined amount. Dry particles will pass directly up to the fan or blower 40 while moisture saturated particles, being heavier, will float in the upright portion 72 until they become sufficiently dry for the air stream to lift them.

I have found that in this process, the fuel value of the reduced wood is increased to a surprising and unexpected extent. Theoretically, the improvement in heating value (B.t.u.'s per pound) resulting from removing moisture from the wood would be about 7% and according to Marks Handbook For Mechanical Engineers, Fourth Edition, the high heat value of green white pine having about 50% moisture is increased by less than 5% when the moisture content is reduced to 12%. I have found, however, that in the present process, the increase in fuel value of wet wood or bark treated with my process ranges from a possible 200% increase in the case of pink bark having a moisture content of about 50% and in the case of wood waste having more than 65% moisture content, my process converts an expensive waste to a fuel worth $4.00 to $5.00 per ton.

In a simplified installation of my process, the wood chips and hot gases were blown from the fan 32 to a simple cyclone and there the hot gas was removed. The flue gas entered the breaker at about 550° F. to 600° F. and left the cyclone at about 250° F. to 300° F. The wet bark which was subject to the hot gases for only a brief time, about 30 seconds, was raised to a temperature of about 140° F. and then spread in a thin layer to permit the water to evaporate. The following table shows the moisture removal on different runs:

| | Sample 1 | Sample 2 | Sample 3 |
|---|---|---|---|
| Percent moisture before treatment | 43.20 | 54.4 | 38.80 |
| Percent moisture after treatment | 31.65 | 35.0 | 32.75 |
| Percent reduction | 26.9 | 35.8 | 15.6 |

The fuel value of the processed wood (B.t.u.'s per pound of bone dry wood present) increased from about 3,000 to about 3,800 an increase of over 26%.

The surprisingly large increase in fuel value has been determined by actual measurement and apparently the wood fibers go through some change in physical structure to account for this high fuel value.

It is known that if wet wood is heated in a dry atmosphere the wood becomes "case hardened" and the moisture in the interior of the wood is sealed in. Consequently when lumber is kiln dried, very high humidity is maintained during heating.

In the present invention, the wood is heated in an atmosphere having a large moisture content due to the vapor in the flue gas. If there is insufficient moisture, steam from the boiler may be added into the conduit 40 through a pipe 74 under the control of a suitable valve 76. As the temperature of the flue gas drops to or below its dew point the wood may actually take up moisture from the flue gas.

When the wood chips pass through the air lock 56, they are at a relatively high temperature, preferably near or above the boiling point of water and are in a condition in which they will give up moisture rapidly. Atmospheric air at ambient temperature contains far less moisture than the wood so that even when the intake end of conduit 58 is open to the atmosphere the chips give up their moisture quickly. The drying of the chips is enhanced by the fact that they are drawn through the conduit 58 by suction and are therefore subjected to reduced pressure of several inches of water below atmospheric air. It is believed that the evaporation of the water expands the wood particles and leaves them in a porous state so that they will take up air for better combustion. The use of heated air from the heat exchanger 60 is preferred because it accelerates drying and also heats the wood but the process is operative without the heat exchanger.

In the preferred apparatus described in detail above, the wood is dried, quickly, uniformly and thoroughly. By reducing all chips to substantially uniform size by recirculating and rechopping oversize chips, the chips are thoroughly and uniformly heated by the gas. The delaying of the chips between the breaker 24 and the air lock 56 subjects them to heat for a longer period and the enlarged vertical conduit section 72 holds moisture laden chips in suspension until they are sufficiently light and dry to be lifted by the air. By regulating the air velocity in this conduit section any desired uniform degree of dryness can be obtained for a particular wood.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claims are therefore intended to be embraced therein.

What is claimed and desired to be secured by United States Letters Patent is:

Apparatus for reducing wood to particles of predetermined maximum size comprising a wood breaker, a cyclone, a cylindrical foraminous screen within said cyclone, said screen being substantially coaxial with and spaced from the wall of said cyclone, means for blowing broken particles from said wood breaker into said cyclone within and tangentially of said screen, and funnel means attached to the bottom of said screen and terminating in a conduit for returning particles which fail to pass through said screen to the wood breaker.

References Cited in the file of this patent

UNITED STATES PATENTS

| | | |
|---|---|---|
| 748,894 | Trump | Jan. 5, 1904 |
| 1,125,862 | McMullen | Jan. 19, 1915 |
| 1,299,791 | Seaman | Apr. 8, 1919 |
| 1,312,759 | Stacey | Aug. 12, 1919 |
| 1,817,228 | Bliss | Aug. 4, 1931 |
| 2,219,453 | Mosley | Oct. 29, 1940 |
| 2,313,956 | McGrane | Mar. 16, 1943 |
| 2,478,970 | Koon | Aug. 16, 1949 |
| 2,513,370 | Shaw | July 4, 1950 |
| 2,657,797 | Ledgett et al. | Nov. 3, 1953 |

OTHER REFERENCES

Carrier: "Drying and Processing," published 1929 by the Carrier Engineering Corp., pages 57 to 59.

UNITED STATES PATENT OFFICE
CERTIFICATE OF CORRECTION

Patent No. 2,984,015                          May 16, 1961

William T. S. Montgomery

It is hereby certified that error appears in the above numbered patent requiring correction and that the said Letters Patent should read as corrected below.

Column 2, line 28, for "work" read -- bark --; column 3, line 7, for "whihc" read -- which --; line 31, for "recirulating" read -- recirculating --; column 4, line 15, for "pink" read -- pine --.

Signed and sealed this 10th day of October 1961.

(SEAL)
Attest:

ERNEST W. SWIDER                               DAVID L. LADD
Attesting Officer                                     Commissioner of Patents

USCOMM-DC